United States Patent
Ziech et al.

(10) Patent No.: US 6,733,021 B1
(45) Date of Patent: May 11, 2004

(54) VEHICLE SUBFRAME MOUNTING

(75) Inventors: James Ziech, Kalamazoo, MI (US); Michael L. Zebolsky, Marshall, MI (US)

(73) Assignee: Dana Corporation, Toledo, OH (US)

( * ) Notice: Subject to any disclaimer, the term of this patent is extended or adjusted under 35 U.S.C. 154(b) by 77 days.

(21) Appl. No.: 10/014,281

(22) Filed: Oct. 26, 2001

(51) Int. Cl.⁷ ............................................. B62D 21/11
(52) U.S. Cl. .............................. 280/124.109; 280/785; 180/311
(58) Field of Search ................... 280/124.109, 781, 280/785, 788, 793, 794, 795, 800, 124.134, 124.135; 180/311, 312, 299

(56) References Cited

U.S. PATENT DOCUMENTS

| | | | |
|---|---|---|---|
| 2,866,651 A | 12/1958 | Powell | 280/96.2 |
| 3,856,323 A | 12/1974 | Arning et al. | 280/96.2 R |
| 3,913,696 A | 10/1975 | Kennedy et al. | 180/11 |
| 3,958,653 A | 5/1976 | Arning et al. | 180/157 |
| 4,032,125 A | 6/1977 | Minakawa et al. | 267/63 A |
| 4,909,533 A | 3/1990 | Miles et al. | 280/673 |
| 4,964,651 A | 10/1990 | Kubo | 280/690 |
| 5,879,026 A | 3/1999 | Dostert et al. | 280/781 |
| 5,918,893 A | 7/1999 | Marquardt et al. | 280/124.109 |
| 6,105,984 A | 8/2000 | Schmitz et al. | 280/124.136 |
| 6,120,060 A * | 9/2000 | Kocer et al. | 280/788 |
| 6,357,769 B1 * | 3/2002 | Omundson et al. | 280/124.109 |
| 6,398,262 B1 * | 6/2002 | Ziech et al. | 280/785 |

FOREIGN PATENT DOCUMENTS

| | | |
|---|---|---|
| EP | 0 678 405 A2 | 10/1995 |
| EP | 0 940 320 A1 | 9/1999 |

* cited by examiner

*Primary Examiner*—Paul N. Dickson
*Assistant Examiner*—Faye M. Fleming
(74) *Attorney, Agent, or Firm*—Dykema Gossett PLLC

(57) ABSTRACT

A subframe for a vehicle with an improved mounting arrangement is provided. The subframe includes a first member extending transverse to the longitudinal frame rails on a vehicle frame and is mounted to the frame at a first mounting point between the frame rails. The subframe further includes second and third members that extend from either side of the first member to support suspension control arms, spring/shock units, and a steering linkage. The second and third members are coupled to the frame rails at second and third mounting points. The three mounting points form a generally triangular mounting arrangement that enables greater deflection of the frame rails. Rubber isolators may be used at the mounting points to further increase frame rail deflection and reduce vibration. Further, the second and third members form spring seats for the spring/shock units at locations outboard of the frame rails thereby moving spring reaction points outboard of the vehicle frame.

17 Claims, 4 Drawing Sheets

VEHICLE SUBFRAME MOUNTING

BACKGROUND OF THE INVENTION

1. Field of the Invention

This invention relates to vehicle subframes and, in particular, to subframe mounting on a vehicle frame.

2. Disclosure of Related Art

Conventional vehicles having independent front suspensions often include a subframe that provides structural support to the wheel and suspension components forming the vehicle steering axle. Conventional subframes, however, suffer from several drawbacks. First, conventional subframes are generally mounted to the vehicle frame on, or proximate to, the longitudinal frame rails of the vehicle frame at four or more mounting points. This mounting configuration fails to allow sufficient deflection of the frame rails as the vehicle frame flexes due to external loading. Second, conventional subframes are often mounted to the vehicle frame using welds or metal fasteners. As a result, vibration resulting from road travel is transferred to the vehicle frame and can also weaken the joints between the frame and subframe.

There is thus a need for a subframe for a vehicle that will minimize or eliminate one or more of the above-mentioned deficiencies.

SUMMARY OF THE INVENTION

The present invention provides a subframe for a vehicle.

In accordance with the present invention, a subframe is provided for use in a vehicle having a frame that includes first and second longitudinally extending frame rails. The inventive subframe includes a first member that extends transverse to the vehicle frame and is coupled to the frame at a first mounting point between the first and second frame rails. The inventive subframe further includes second and third members extending from either transverse side of the first member. The second and third members are coupled to the first and second frame rails, respectively, at second and third mounting points. The second and third mounting points may be disposed outboard of the first and second frame rails. In accordance with one embodiment of the present invention, the subframe may further include rubber isolators at one or more of the mounting points between the subframe and the vehicle frame.

A subframe in accordance with the present invention represents a significant improvement as compared to conventional subframes. In particular, the three-point mounting arrangement of the present invention enables greater deflection of the vehicle frame rails during external loading. The additional use of rubber isolators further enables frame rail deflection while also dampening vibrations transmitted to the vehicle frame. The subframe is also capable of integration into a subassembly with various vehicle suspension and steering components. In this connection, the second and third members of the subframe may form spring seats outboard of the vehicle frame rails. The location of these spring seats reduces torsional loads on the frame rails.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
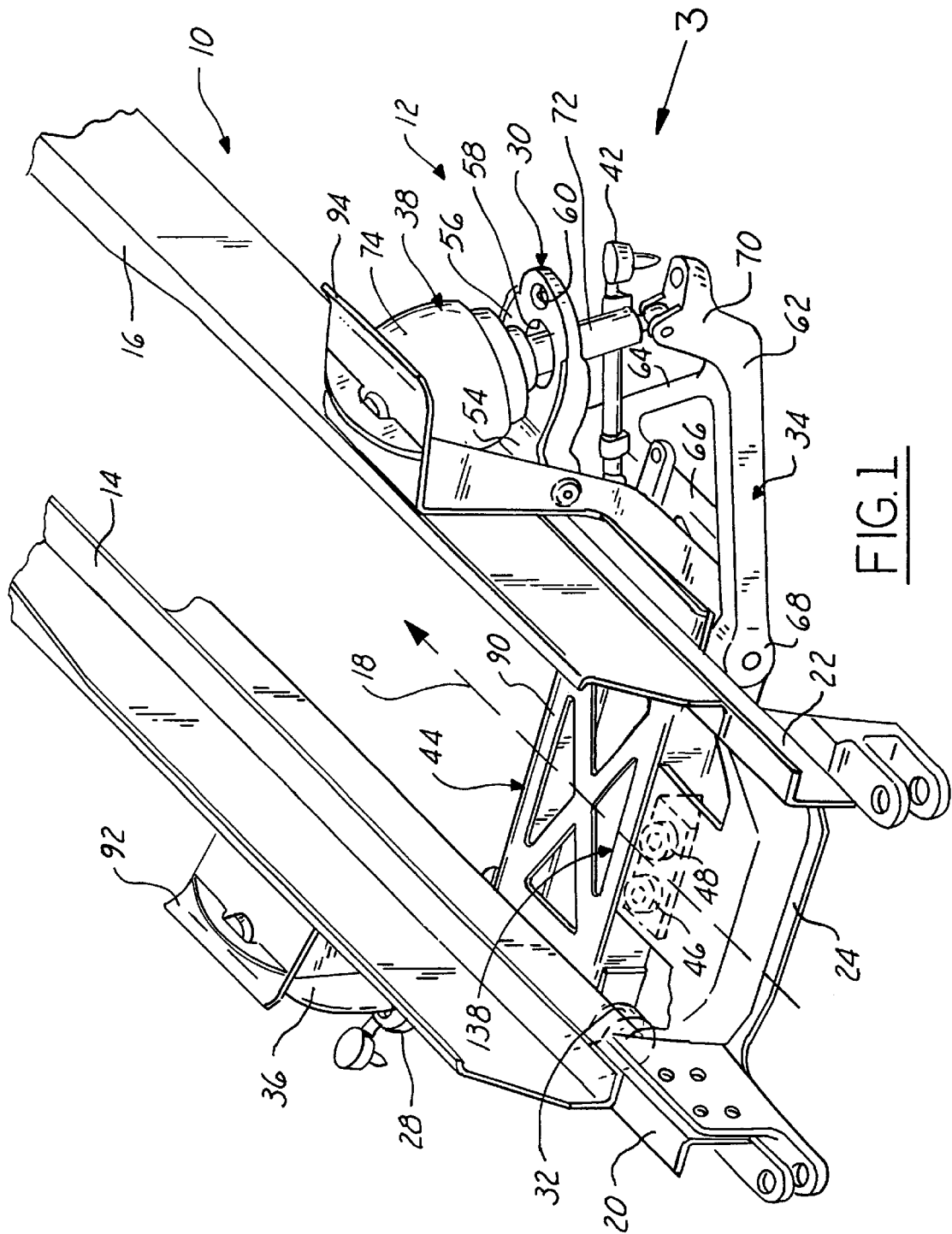
FIG. 1 is a perspective view of a vehicle frame having a subassembly and subframe in accordance with the present invention mounted thereto.

Referring now to the drawings wherein like reference numerals are used to identify identical components in the various views, FIG. 1 illustrates a vehicle frame 10 to which is coupled a suspension and steering subassembly 12 in accordance with the present invention. The illustrated frame 10 and subassembly 12 are particularly adapted for use in heavy truck applications. It should be understood, however, that the present invention may find application in other types of vehicles.

Frame 10 is provided to support an engine (not shown), cab (not shown) and other components of a heavy truck. Frame 10 is conventional in the art and may be made from conventional metals and metal alloys such as steel. Frame 10 includes a pair of longitudinal rails 14, 16 extending parallel to an axis 18 that extends in the direction of vehicle travel and in the longitudinal direction of the truck. Frame 10 may also includes a pair of frame extensions or reinforcement members 20, 22 and a cross-member 24. Frame may also include a plurality of mounting brackets 26 (best seen in FIGS. 3 and 4).

Rails 14, 16 are provided to secure and align a cab on frame 10 and are conventional in the art. Rails 14, 16 are generally C-shaped in cross-section and open toward one another. Rails 14, 16 may include a plurality of apertures configured to received bolts, screws, or other fasteners to secure mounting brackets 26 to rails 14, 16.

Reinforcement members 20, 22 provide additional torsional stiffness to frame 10 and are conventional in the art. Members 20, 22 support, and are disposed below, rails 14, 16 respectively. Members 20, 22 are L-shaped in cross-section in the illustrated embodiment. It should be understood, however, that the shape of members 20, 22 may vary. Members 20, 22 may be coupled to rails 14, 16 using bolts, screws, welds, or other fastening means. Members 20, 22 may alternately be made a part of the subframe of subassembly 12.

Cross-member 24 is provided to support the vehicle engine (not shown) and is also conventional in the art. Member 24 may be cast from aluminum. Member 24 is fastened to reinforcement members 20, 22 using bolts, screws, welds, or other fastening means and extends in a direction that is generally transverse to axis 18 and the direction of vehicle travel.

Figure 3:
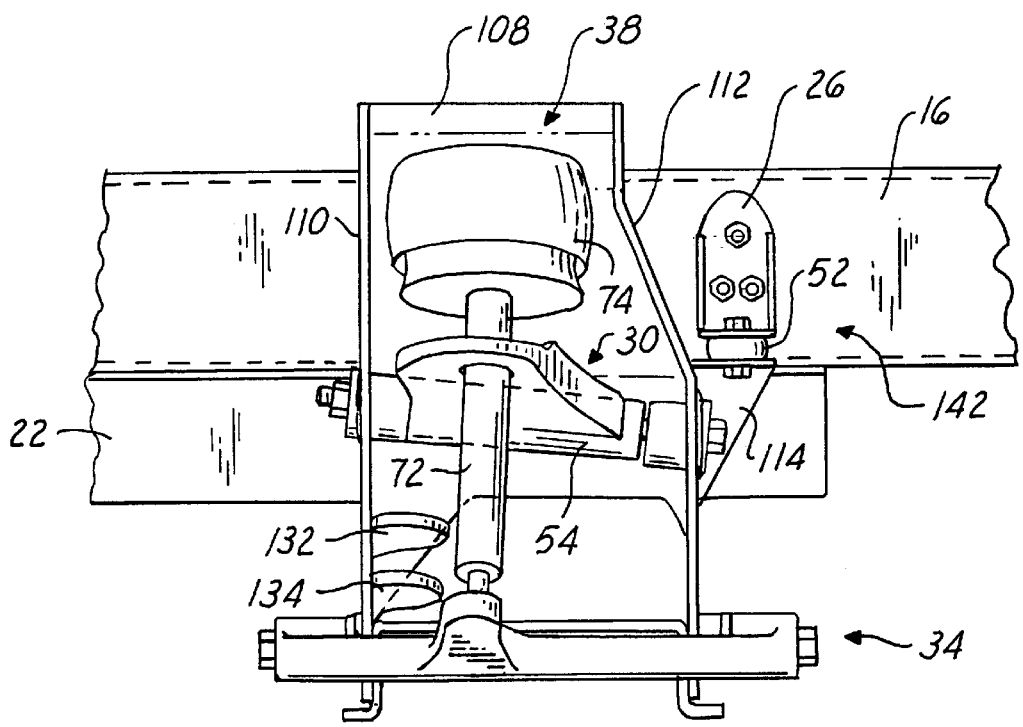
FIG. 3 is a side view of a portion of the subassembly illustrated in FIG. 1.
Figure 4:
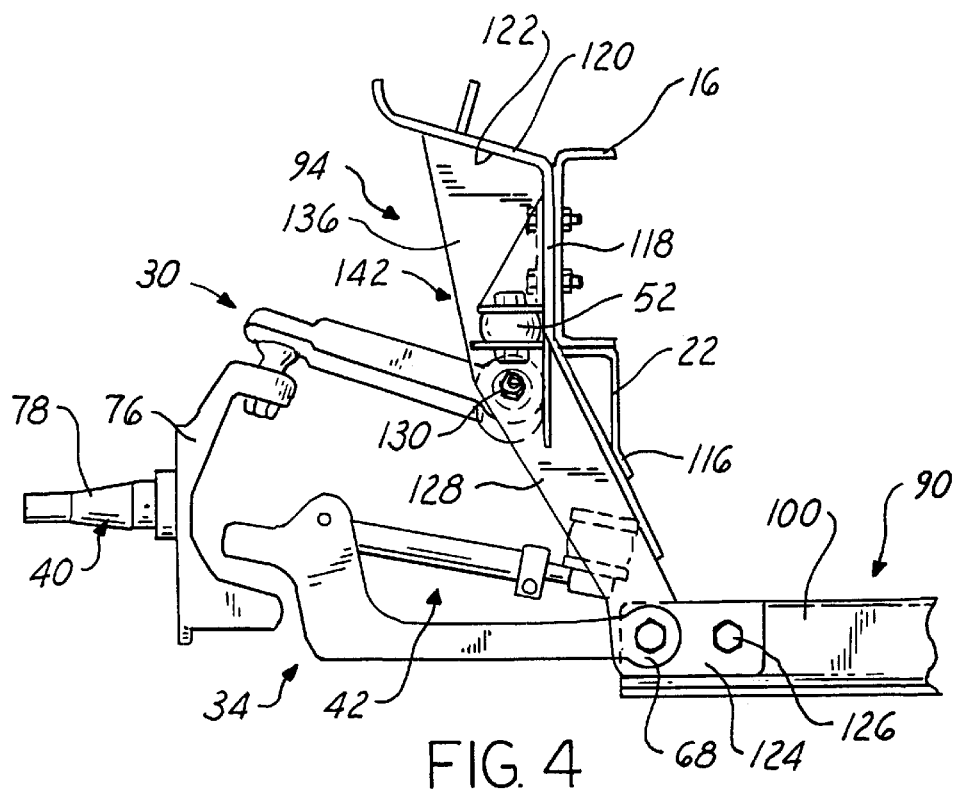
FIG. 4 is a rear view of a portion of the subassembly illustrated in FIG. 1.

Referring to FIGS. 3 and 4, brackets 26 are provided to mount elements of subassembly 12 to frame 10 as described in greater detail hereinbelow and are conventional in the art. It will be understood by those skilled in the art that the number, shape, and configuration of brackets 26 may vary depending upon the design requirements of subassembly 12 and other components of the vehicle.

Referring again to FIG. 1, suspension and steering subassembly 12 provides an independent front suspension and steering system for the vehicle. Subassembly 12 may include upper suspension control arms 28, 30, lower suspension control arms 32, 34, spring/shock units, 36, 38, steering knuckles 40 (one of which is shown in FIG. 3), a steering linkage 42, and a subframe 44 in accordance with the present invention. Assembly may also includes means, such as isolators 46, 48 and, referring to FIGS. 2–6, isolators 50, 52 for coupling subframe 44 to frame 10.

Upper and lower suspension control arms 28, 30, 32, 34 provide a means for mounting steering knuckles 40 on either side of the vehicle and for adjustment of the vehicle wheels (not shown). Arms 28, 30, 32, 34 also provide mounting points for shock/spring units 36, 38. Arms 28, 30, 32, 34 are conventional in the art and may be made from a variety of conventional metals and metal alloys. In the illustrated embodiment, each of upper control arms 28, 30 includes a bushing 54 from which a generally semi-circular flange 56 extends. Bushing 54 is received by subframe 44 as described in greater detail hereinbelow. Flange 56 includes an aperture 58 configured to allow one of spring/shock units 36, 38 to extend therethrough and another aperture 60 through which flange 56 may be coupled to steering knuckle 40 (as shown in FIG. 3). Each of lower suspension control arms 32, 34 is generally A-shaped including a pair of legs 62, 64 and a cross-member 66. A bushing 68 is disposed at the inboard end of each leg 62, 64 and is received by subframe 44 as described hereinbelow. Legs 62, 64 define a mounting member 70 at the outboard intersection of legs 62, 64 for mounting one of spring/shock units 36, 38 and one of steering knuckles 40 (as shown in FIG. 3). It should be understood by those of skill in the art that the size, shape, and configuration of arms 28, 30, 32, 34 may vary depending upon design requirements associated with the vehicle and its components without departing from the spirit of the present invention.

Spring/shock units 36, 38 are provided to cushion the ride of the vehicle. Units 36, 38 are conventional in the art any may each include a shock 72 and an air or coil spring 74. Shock 72 is supported at one end by mounting member 70 of a corresponding lower suspension control arm 32, 34. The other end of shock 72 extends into a bladder of air spring 74. Air spring 74 is disposed against subframe 44 as described in greater detail hereinbelow.

Referring now to FIG. 3, steering knuckles 40 are provided to mount one or more vehicle wheels and are conventional in the art. Each knuckle 40 includes a body 76 from which a spindle 78 extends to support the vehicle wheels. Knuckles 40 are coupled to upper suspension control arms 28, 30 using conventional fasteners that extend through apertures 60 and to lower suspension control arms 32, 34 at mounting members 70. Knuckles 40 may also include tie rod arms (not shown) for connection with linkage 42.

Figure 5:
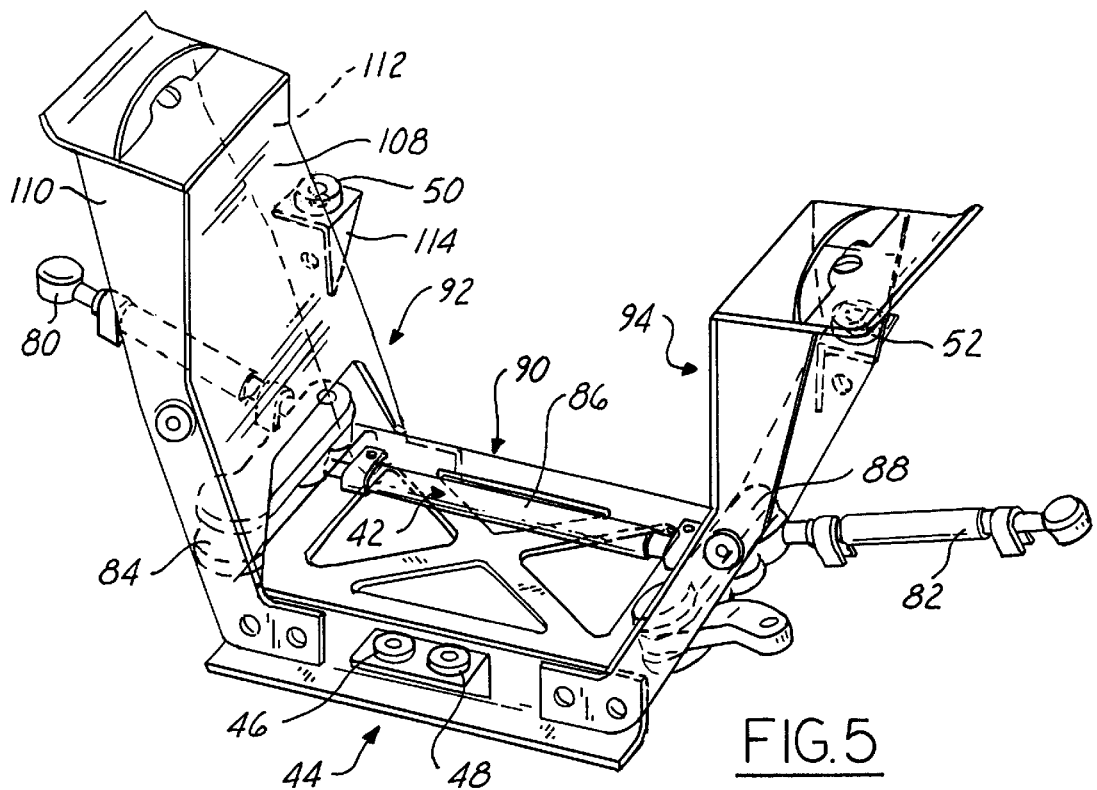
FIG. 5 is a perspective view of a subframe in accordance with the present invention incorporating a steering linkage.
Figure 6:
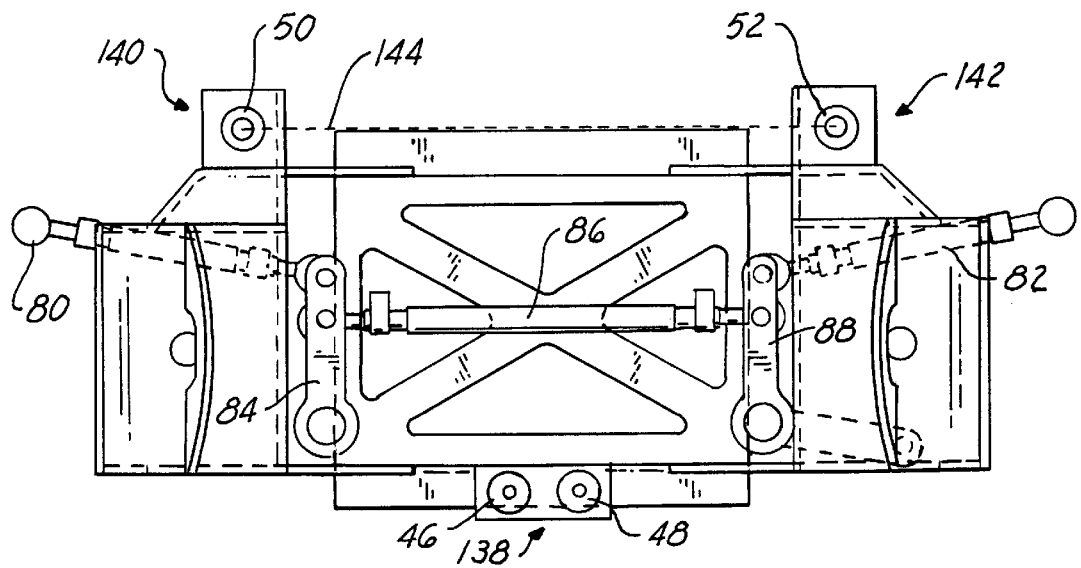
FIG. 6 is a top view of the portion of a subframe in accordance with the present invention incorporating a steering linkage.

Steering linkage 42 provides directional control of the vehicle wheels (not shown) responsive to driver control of the steering wheel (not shown) by transferring motion of the steering gear output shaft (not shown) to the vehicle wheels. Linkage 42 is conventional in the art. Referring to FIGS. 5 and 6, linkage 42 may include outer tie rods 80, 82, an idler arm 84, a cross link 86, and a bell crank 88. Tie rods 80, 82 are connected to the steering knuckles 40 at their outboard ends and to idler arm 84 and bell crank 88, respectively, at their inboard ends. Cross link 86 couples idler arm 84 and bell crank 88. Bell crank 88 is in turn coupled to a steering gear output shaft (not shown) by a drag link (not shown). Crank 88 rotates responsive to rotation of the steering gear output shaft and causes corresponding movement in link 86, arm 84, and tie rods 80 82 to turn the vehicle wheels (not shown).

Figure 2:
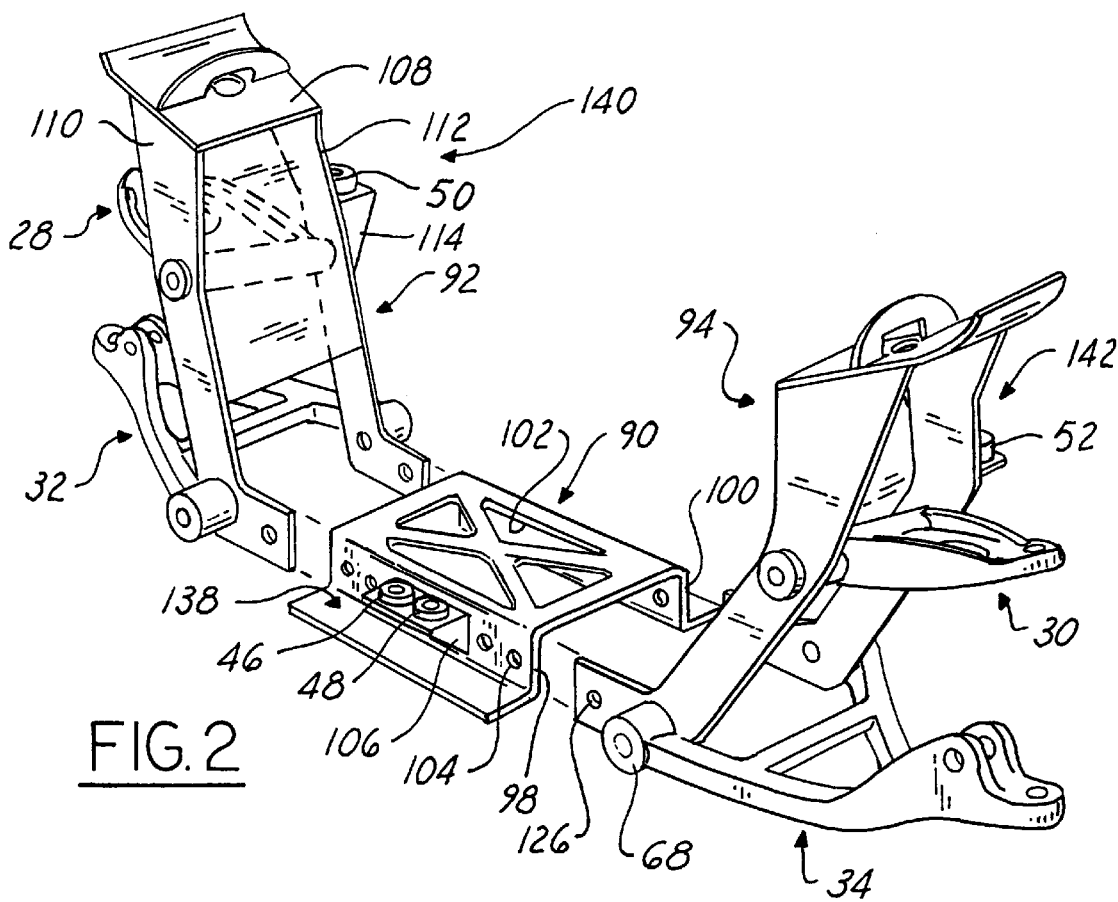
FIG. 2 is an exploded, perspective view of a portion of the subassembly and the subframe of FIG. 1.

Referring to FIG. 2, subframe 44 provides structural support to the wheel and suspension components forming the vehicle steering axle. Subframe 44 includes first, second, and third members 90, 92, 94 each of which may be made from conventional metals and metal alloys such as steel. Those skilled in the art will recognize that members 90, 92, 94 may be integral with one another rather than coupled together (i.e. subframe 44 may be substantially one piece).

Member 90 couples members 92, 94, and the wheel and suspension components on either side of vehicle, together. Member 90 extends transversely to frame 10 and the longitudinal direction of the vehicle. Member 90 is generally U-shaped in cross-section and includes an upper wall 96 and a pair of side walls 98, 100. Upper wall 96 includes a plurality of apertures 102 configured to reduce the weight of member 90 while maintaining structural integrity. Side walls 98, 100 extend downwardly from upper wall 96. Walls 98, 100 may include one or more apertures 104 configured to receive fasteners used to couple members 92, 94 to member 90. Member 90 may also include a mounting bracket 106 on which isolators 46, 48 are disposed. Bracket 106 may be integral with side wall 98 or coupled thereto using welds or another conventional fastening means.

Members 92, 94 provide a means for mounting upper and lower suspension control arms 28, 30, 32, 34, spring/shock units 36, 38, steering knuckles 40, and steering linkage 42. Each of members 92, 94 includes a center wall 108 and a pair of side walls 110, 112. Each of members 92, 94 may also include at least one bracket 114. Although each of walls 108, 110, 112 and brackets 114 will be described hereinbelow in greater detail, it should be understood that the size, shape, and configuration of walls 108, 110, 112, and brackets 114 may be varied without departing from the spirit of the present invention.

Center wall 108 connects side walls 110, 112 and provides a spring seat for a corresponding spring/shock unit 36, 38. Wall 108 extends between side walls 110, 112 and may be integral therewith or coupled thereto using welds or other conventional fastening means. Referring to FIG. 4, a first portion 116 of wall 108 extends upwardly in a generally outboard direction. The lower end of portion 116 is disposed inboard of a corresponding frame rail 14, 16 while the upper end of portion 116 is disposed outboard of the frame rail 14, 16. A second portion 118 of wall 108 extends vertically from portion 116 and may be disposed against the outboard side of the frame rail 14, 16. A third portion 120 of wall 108 extends upwardly from portion 118 in a generally outboard direction, curling back inwardly at its furthest outboard point. In accordance with one aspect of the present invention, the bottom side 122 of portion 120 of wall 108 provides a spring seat for air spring 54 of the corresponding spring/shock unit 36, 38. By locating the spring reaction point outboard of the vehicle frame rails 14, 16, the inventive subframe 44 reduces torsional load on the frame rails 14, 16.

Referring again to FIG. 2, side walls 110, 112 of members 92, 94 extend upwardly from member 90 and in a generally outboard direction. Referring to FIG. 4, the lowermost portion 124 of each side wall 92, 94 includes apertures 126 (best shown in FIG. 2) that are configured for alignment with apertures 104 in member 90. Apertures 126 are configured to receive fasteners used to couple members 92, 94 to member 90. Those skilled in the art will recognize that members 90, 92, 94 may also be welded or made integral with one another thereby eliminating apertures 126 and the associated fasteners. The same fasteners may be extend through bushings 68 on lower suspension control arms 32, 34 to couple arms 34, 34 to members 92, 94. Another portion 128 of each of side walls 110, 112 extends upwardly from portion 124 in an outboard direction. Portion 128 may include apertures 130 configured to receive one of more fasteners used to couple upper suspension control arms 28, 30 to members 92, 94. Referring to FIG. 3, portion 128 may also include a pair of mounting elements 132, 134. Referring to FIGS. 5 and 6, elements 132, 134 are configured to receive one of idler arm 84 or bell crank 88. Referring again to FIGS. 3 and 4, the uppermost portion 136 of each of side wall 110, 112 extends generally vertically from portion 128 although the uppermost portion 136 of wall 112 may also be angled forward relative to the direction of vehicle travel.

Brackets 114 are provided to mount isolators 50, 52. Brackets 114 may be integral with portion 128 of each side wall 110, 112 or may be coupled thereto using welds or other conventional fastening means. Brackets 114 include a generally flat surface against which isolators 50, 52 are disposed Isolators 46, 48, 50, 52 are provided to dampen vibrations transmitted to frame 10 and also to allow greater deflection of frame rails 14, 16. Isolators 46, 48, 50, 52 are conventional in the art and may be made from natural rubber, polyurethane, or other conventional viscoelastic damping materials. Isolators 46, 48 may be disposed between member 90 of subframe 44 and cross member 24 of frame 10. Isolators 50, 52 may be disposed between mounting brackets 114 on members 92, 94 of subframe 44 and mounting brackets 26 of frame 10. A screw or other fastener may extend through each of isolators 46, 48, 50, 52 to couple the brackets on either side of the isolators 46, 48, 50, 52 together.

Referring now to FIGS. 1–4, in accordance with the present invention subframe 44 is mounted to frame 10 at three mounting points 138, 140, 142. Referring to FIG. 1, member 90 of subframe 44 is coupled to frame 10 at a mounting point 138 disposed between frame rails 14, 16 of frame 10. Referring to FIGS. 2–4, members 92, 94 of subframe 44 are coupled to frame rails 14, 16 at mounting points 140, 142. Mounting points 140, 142 may be disposed at a location outboard of frame rails 14, 16. Referring to FIG. 6, mounting points 140, 142 may be connected by a line 144 (shown in dots) extending transverse to axis 18 and the longitudinal direction of the vehicle. Mounting point 138 is disposed on one side of the line 144, thereby forming a triangular or three-point mounting arrangement for coupling subframe 44 to frame 10. This mounting arrangement represents a significant improvement over the prior art because the mounting arrangement allows greater deflection of frame rails and frame during external loading. It should be understood that the locations of mounting points 138, 140, 142 shown in the illustrated embodiment are exemplary only and that the location of mounting points 138, 140, 142 may be varied without departing from the scope of the present invention provided the general triangular, three-point mounting arrangement is maintained.

While the invention has been particularly shown and described with reference to the preferred embodiments thereof, it is well understood by those skilled in the art that various changes and modifications can be made in the invention without departing from the spirit and scope of the invention.

We claim:

1. A subframe for a vehicle, comprising:
   a first member extending transverse to a frame of said vehicle and coupled to said frame at a first mounting point between first and second longitudinally extending frame rails of said frame by a first isolator disposed between said first member and said frame; and,
   second and third members extending from either transverse side of said first member and coupled to said first and second frame rails of said frame at second and third mounting points, respectively.

2. The subframe of claim 1 wherein a second isolator is disposed between said first member and said frame.

3. A subframe for a vehicle, comprising:
   a first member extending transverse to a frame of said vehicle and coupled to said frame at a first mounting point between first and second longitudinally extending frame rails of said frame; and,
   second and third members extending from either transverse side of said first member and coupled to said first and second frame rails of said frame at second and third mounting points, respectively
   wherein said second member defines a spring seat and said spring seat is disposed outboard of said first longitudinal frame rail.

4. A subframe for a vehicle, comprising:
   a first member extending transverse to a frame of said vehicle and coupled to said frame at a first mounting point between first and second longitudinally extending frame rails of said frame; and,
   second and third members extending from either transverse side of said first member and coupled to said first and second frame rails of said frame at second and third mounting points, respectively
   wherein said second and third mountings points are disposed outboard of said first and second frame rails.

5. A subframe for a vehicle, comprising:
   a first member extending transverse to a frame of said vehicle and coupled to said frame at a first mounting point between first and second longitudinally extending frame rails of said frame; and,
   second and third members extending from either transverse side of said first member and coupled to said first and second frame rails of said frame at second and third mounting points, respectively;
   a first isolator disposed between said first member and said frame at said first mounting point;
   a second isolator disposed between said second member and said first frame rail of said frame at said second mounting point; and,
   a third isolator disposed between said third member and said second frame rail of said frame at said third mounting point.

6. The subframe of claim 5, further comprising a fourth isolator disposed between said first member and said frame at said first mounting point.

7. The subframe of claim 5 wherein said second member defines a spring seat.

8. The subframe of claim 7 wherein said spring seat is disposed outboard of said first longitudinal frame rail.

9. The subframe of claim 5 wherein said first mounting point is disposed on one side of a line connecting said second and third mounting points.

10. The subframe of claim 5 wherein said second and third mounting points are disposed outboard of said first and second frame rails.

11. A subassembly for a vehicle, comprising:
    a subframe having
    a first member extending transverse to a frame of said vehicle and coupled to said frame-at a first mounting point between first and second longitudinally extending frame rails of said frame; and, second and third members extending from either transverse side of said first member and coupled to said first and second frame rails of said frame at second and third mounting points, respectively;

first and second upper suspension control arms coupled to said second and third members, respectively;

first and second lower suspension control arms coupled to said second and third members, respectively; and, first and second spring/shock units coupled at one end to said first and second lower suspension control arms, respectively, and having a second end received within spring seats defined in said second and third members.

12. The subassembly of claim 11, further comprising means for coupling said first member to said frame.

13. The subassembly of claim 12 wherein said coupling means includes first and second isolators disposed between said first member and said frame.

14. The subassembly of claim 11 wherein said spring seats are disposed outboard of said first and second frame rails.

15. The subassembly of claim 11 wherein said first mounting point is disposed on one side of a line connecting said second and third mounting points.

16. The subassembly of claim 11 wherein said second and third mounting points are disposed outboard of said first and second frame rails.

17. The subassembly of claim 11 wherein said first, second, and third members are integral with one another.

* * * * *